(12) United States Patent
Nagao

(10) Patent No.: US 11,438,501 B2
(45) Date of Patent: Sep. 6, 2022

(54) IMAGE PROCESSING APPARATUS, AND CONTROL METHOD, AND STORAGE MEDIUM THEREOF

(71) Applicant: CANON KABUSHIKI KAISHA, Tokyo (JP)

(72) Inventor: Atsushi Nagao, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 16/889,477

(22) Filed: Jun. 1, 2020

(65) Prior Publication Data
US 2020/0382697 A1 Dec. 3, 2020

(30) Foreign Application Priority Data
Jun. 3, 2019 (JP) .............................. JP2019-103947

(51) Int. Cl.
*H04N 5/232* (2006.01)
*H04N 5/765* (2006.01)
(Continued)

(52) U.S. Cl.
CPC ....... *H04N 5/23222* (2013.01); *G06K 9/6215* (2013.01); *G06N 3/08* (2013.01);
(Continued)

(58) Field of Classification Search
CPC ............... H04N 5/23222; H04N 5/765; H04N 5/23206; H04N 5/23245; H04N 5/23296; H04N 5/23299; H04N 5/772; H04N 9/8042; H04N 5/23218; H04N 5/2253; H04N 5/2254; H04N 5/23219; H04N 5/23229; H04N 5/23241; G06K 9/6215; G06K 9/6271; G06K 9/6255; G06K 9/6257;
(Continued)

(56) References Cited

U.S. PATENT DOCUMENTS

| | | | |
|---|---|---|---|
| 8,081,227 B1 * | 12/2011 | Kim ................... | H04N 5/23206 348/211.3 |
| 8,259,208 B2 * | 9/2012 | Ciurea ................. | G06F 3/0488 345/173 |

(Continued)

FOREIGN PATENT DOCUMENTS

| | | |
|---|---|---|
| JP | 2015-170306 A | 9/2015 |
| JP | 2016-536868 T | 11/2016 |
| WO | 2015/055655 A1 | 4/2015 |

OTHER PUBLICATIONS

The document was cited in a British Search Report dated Nov. 30, 2020, which is enclosed, that issued in the corresponding U.K. Patent Application No. 2007909.1.

(Continued)

*Primary Examiner* — Michael S Osinski
(74) *Attorney, Agent, or Firm* — Cowan, Liebowitz & Latman, P.C.

(57) ABSTRACT

An image processing apparatus comprises a determination unit configured to determine that image data stored in a storage device is image data that is to be used for learning a situation in which an image capturing device is to perform automatic image capturing, if an instruction to delete the image data stored in the storage device is given by a user, and the image data satisfies a predetermined condition.

13 Claims, 11 Drawing Sheets

(51) Int. Cl.
  *G06K 9/62* (2022.01)
  *G06N 3/08* (2006.01)
  *G06T 7/00* (2017.01)
  *G06V 10/75* (2022.01)
  *G06N 3/04* (2006.01)

(52) U.S. Cl.
  CPC .......... *G06T 7/0002* (2013.01); *G06V 10/751* (2022.01); *H04N 5/765* (2013.01); *G06N 3/04* (2013.01); *G06T 2207/20081* (2013.01); *G06T 2207/30168* (2013.01)

(58) Field of Classification Search
  CPC .. G06K 9/6262; G06K 9/6201; G06K 9/6256; G06N 3/08; G06N 3/0454; G06N 3/04; G06N 3/084; G06N 20/00; G06T 7/0002; G06T 7/11; G06T 2207/20081; G06T 2207/10024; G06T 2207/20084; G06T 2207/20021; G06T 2207/20076; G06T 2207/30168; G06T 1/20; G06V 10/751; G06V 10/82; G06V 10/50; G06V 20/30; G06V 40/173; G06V 30/194; G05B 13/029
  See application file for complete search history.

(56) References Cited

U.S. PATENT DOCUMENTS

| | | | | |
|---|---|---|---|---|
| 8,935,322 | B1* | 1/2015 | Grosz | H04L 67/06 709/203 |
| 10,402,699 | B1* | 9/2019 | Chen | G06T 7/277 |
| 10,621,472 | B1* | 4/2020 | Buibas | G06T 3/40 |
| 10,679,358 | B2* | 6/2020 | On | G06T 7/248 |
| 11,102,389 | B2* | 8/2021 | Wakamatsu | H04N 5/23258 |
| 11,165,952 | B2* | 11/2021 | Tada | G06K 9/6262 |
| 11,184,550 | B2* | 11/2021 | Ogawa | H04N 5/23218 |
| 2008/0192129 | A1* | 8/2008 | Walker | H04N 1/2129 348/231.2 |
| 2009/0208068 | A1* | 8/2009 | Tsunoda | H04N 1/327 382/118 |
| 2015/0201129 | A1* | 7/2015 | Mak | H04N 17/002 348/208.5 |
| 2015/0312354 | A1* | 10/2015 | Boyle | H04L 65/4069 709/219 |
| 2017/0046340 | A1* | 2/2017 | Bhide | G06K 9/6215 |
| 2017/0163882 | A1* | 6/2017 | Piramuthu | G06T 1/0007 |
| 2018/0189951 | A1* | 7/2018 | Liston | G06T 7/194 |
| 2018/0300885 | A1* | 10/2018 | On | G06K 9/6255 |
| 2018/0373955 | A1* | 12/2018 | Soldevila | G06F 16/56 |
| 2019/0028634 | A1* | 1/2019 | Koehler | H04N 5/2256 |
| 2019/0182423 | A1* | 6/2019 | Gummadi | H04N 5/232935 |
| 2019/0199917 | A1* | 6/2019 | Kadoi | G06K 9/627 |
| 2020/0162658 | A1* | 5/2020 | Hennings | H04N 5/23258 |
| 2020/0258210 | A1* | 8/2020 | Shen | G06T 1/20 |
| 2020/0357098 | A1* | 11/2020 | Yoo | A61B 5/726 |
| 2021/0085238 | A1* | 3/2021 | Schnabel | A61B 5/4542 |
| 2021/0160431 | A1* | 5/2021 | Chen | H04N 5/23238 |
| 2021/0264608 | A1* | 8/2021 | Ishikawa | G06N 3/0454 |
| 2021/0311986 | A1* | 10/2021 | Sugaya | G06T 7/55 |
| 2021/0374476 | A1* | 12/2021 | Heikel | G06N 3/08 |

OTHER PUBLICATIONS

Ricardo F. Ribeiro, et al., "Image Selection Based on Low Level Properties for Lifelong Moment Retrieval", IEETA/DETI, University of Aveiro, 3810-193 Aveiro, Portugal; ResearchGate; Jan. 2020, ResearchGate;https://researchgate.net/publication/337566061; pp. 1-11.

* cited by examiner

IMAGE PROCESSING APPARATUS, AND CONTROL METHOD, AND STORAGE MEDIUM THEREOF

BACKGROUND OF THE INVENTION

Field of the Invention

The present invention relates to machine learning for causing an image capturing apparatus to capture an image that matches a user's taste.

Description of the Related Art

Usually, in still image/moving image shooting that is performed by an image capturing apparatus such as a camera, the user determines a subject that is to be shot, through a viewfinder and the like, checks the shooting situation by themselves and adjusts framing of an image that is to be shot, and shoots an image by performing an operation on a shutter button.

In contrast to the image capturing apparatus that executes shooting according to such operations made by the user, Japanese Patent Laid-Open No. 2016-536868 discloses a camera that is a so-called lifelog camera that periodically and continuously performs shooting without the user giving a shooting instruction. The lifelog camera is used in a state of being attached to a user's body using a strap or the like, and records sights that the user sees in their daily life, as video images at a certain time interval. Shooting that is performed by the lifelog camera is not performed at a timing intended by the user performing an operation on a shutter, or the like, but is performed at a certain interval, and thus, unintended moments that normally would not have been shot can be kept as video images.

However, when automatic image capturing is performed at a certain time interval as in Japanese Patent Laid-Open No. 2016-536868, there is the issue that a scene that does not match a user's taste may be shot.

By training an image capturing apparatus using images that match a user's taste through machine learning, it is possible to cause the image capturing apparatus to perform automatic image capturing that matches a user's taste. If images that match a user's taste as well as images that don't match a user's taste are learned, an improved effect can be obtained.

Here, there arises an issue as to how to perform determination on an image that does not match a user's taste. For example, it is conceivable to determine an image deleted according to a user's instruction as an image that does not match a user's taste. However, the only reason for the user deleting an image is not only that the image does not match a user's taste, and cases such as where there are a plurality of similar images are also considered as a reason for the user deleting an image.

SUMMARY OF THE INVENTION

The present invention has been made in light of the above-described issues, and enables learning in which a user's taste is reflected, without the user performing a specific operation.

According to a first aspect of the present invention, there is provided an image processing apparatus comprising at least one processor or circuit configured to function as a determination unit configured to determine that image data stored in a storage device is image data that is to be used for learning a situation in which an image capturing device is to perform automatic image capturing, if an instruction to delete the image data stored in the storage device is given by a user, and the image data satisfies a predetermined condition.

According to a second aspect of the present invention, there is provided a control method of an image processing apparatus, the method comprising determining that image data stored in a storage device is image data that is to be used for learning a situation in which an image capturing device is to perform automatic image capturing, if an instruction to delete the image data stored in the storage device is given by a user, and the image data satisfies a predetermined condition.

Further features of the present invention will become apparent from the following description of exemplary embodiments with reference to the attached drawings.

DESCRIPTION OF THE EMBODIMENTS

Figure 1A:
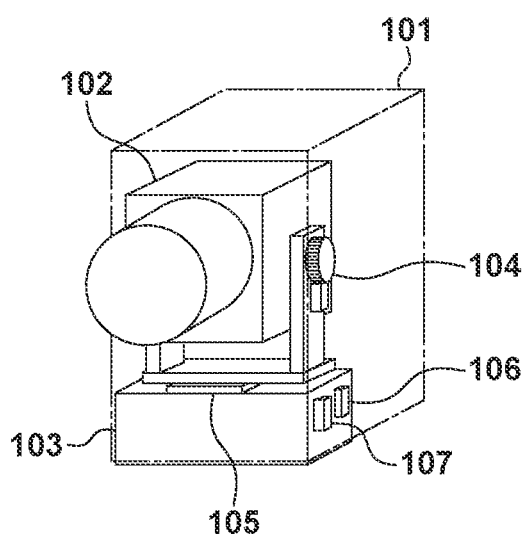
FIGS. 1A and 1B are diagrams schematically showing an image capturing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Image Capturing Apparatus

Figure 1B:
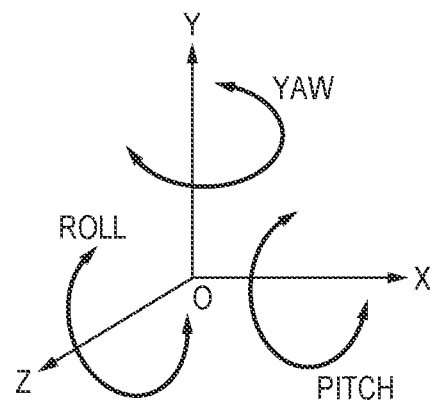

FIGS. 1A and 1B are diagrams schematically showing an image capturing apparatus according to an embodiment of the present invention. The present invention can be applied to not only a digital camera and a digital video camera, but also a surveillance camera, a Web camera, a mobile phone, and the like. In this embodiment, a description will be given assuming a configuration in which an image capturing apparatus itself serves as an image processing apparatus that performs machine learning, but a configuration may also be adopted in which machine learning for an image capturing apparatus is performed in an image processing apparatus that is separate from the image capturing apparatus, and can communicate with the image capturing apparatus.

An image capturing apparatus 101 shown in FIG. 1A is provided with an operation member that enables an operation to be performed on a power supply switch (hereinafter referred to as a "power supply button", and the operation may be a tap, flick, or swipe operation or the like on a touch panel), and the like. A barrel 102 is a case that includes a shooting lens group and an image sensor that perform image capturing, and is provided with a rotation mechanism that is attached to the image capturing apparatus 101, and can rotatably drive the barrel 102 relative to a fixing unit 103. A tilt rotation unit 104 is a motor drive mechanism that can rotate the barrel 102 in the pitch direction shown in FIG. 1B, and a pan rotation unit 105 is a motor drive mechanism that can rotate the barrel 102 in the yaw direction. Thus, the barrel 102 can rotate in the directions of one or more axes. Note that FIG. 1B shows definitions of the axes for the position of the fixing unit 103. Both an angular speed meter 106 and an acceleration rate meter 107 are mounted on the fixing unit 103 of the image capturing apparatus 101. Vibration of the image capturing apparatus 101 is then detected based on the angular speed meter 106 and the acceleration rate meter 107, and the tilt rotation unit and the pan rotation unit are rotatably driven based on a detected shake angle. A configuration is adopted in which, accordingly, shake and inclination of the barrel 102, which is a movable unit, are corrected.

Figure 2:
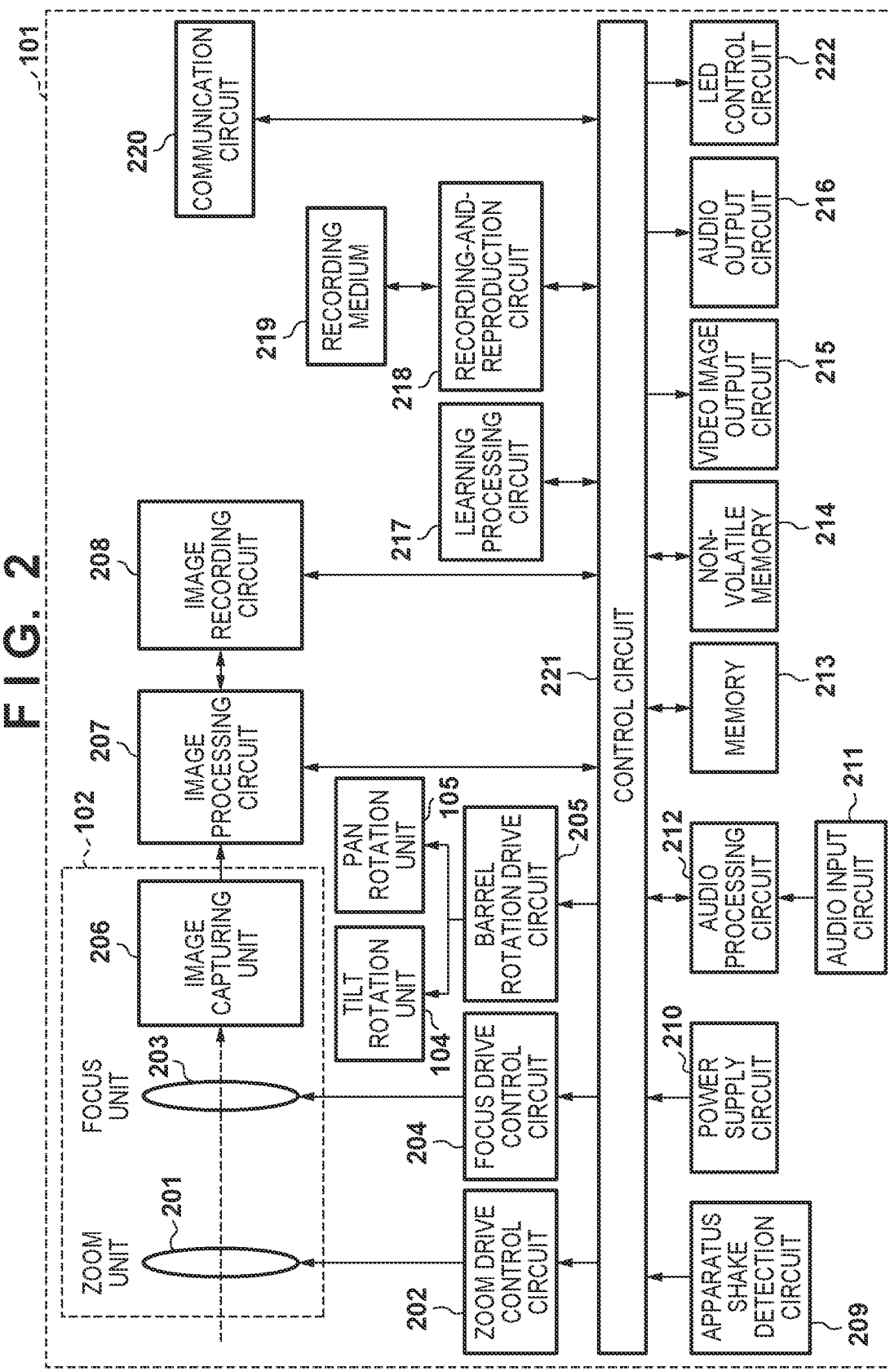
FIG. 2 is a diagram showing a configuration of an image capturing apparatus.

FIG. 2 is a block diagram showing a configuration of an image capturing apparatus of this embodiment. In FIG. 2, a control circuit 221 is constituted by a processor (for example, a CPU, a GPU, a microprocessor, and an MPU), a memory (for example, a DRAM and a SRAM), and the like. These execute various types of processing so as to control the blocks of the image capturing apparatus 101, and control data transfer between blocks. A non-volatile memory (EEPROM) 214 is an electrically erasable/recordable memory, and stores constants for the control circuit 221 to operate, programs, and the like.

In FIG. 2, a zoom unit 201 includes a zoom lens that performs magnification. A zoom drive control circuit 202 performs drive control of the zoom unit 201. A focus unit 203 includes a lens that performs focus adjustment. A focus drive control circuit 204 performs drive control of the focus unit 203.

An image capturing unit 206 includes an image sensor and an A/D converter, and the image sensor receives light that is incident through the lens group, and outputs information regarding electric charges that correspond to the amount of light, as analog image signals, to an image processing circuit 207. The image processing circuit 207 is a calculation circuit in which a plurality of ALUs (Arithmetic and Logic Units) are mounted, and applies image processing such as distortion correction, white balance adjustment, and color interpolation processing to digital image data output through A/D conversion, and outputs the processed digital image. The digital image data output from the image processing circuit 207 is converted into a recording format such as JPEG by an image recording circuit 208, and is transmitted to a memory 213 and a video image output circuit 215 to be described later.

A barrel rotation drive circuit 205 drives the tilt rotation unit 104 and the pan rotation unit 105 so as to drive the barrel 102 in the tilt direction and pan direction.

For example, the angular speed meter (gyro sensor) 106 that detects the angular speeds of the image capturing apparatus 101 in the three axial directions and the acceleration rate meter (acceleration rate sensor) 107 that detects the acceleration rates of the apparatus in the three axial directions are mounted in an apparatus shake detection circuit 209. In the apparatus shake detection circuit 209, the rotation angle of the apparatus, the shift amount of the apparatus, and the like are calculated based on detected signals.

An audio input circuit 211 acquires audio signals of the surroundings of the image capturing apparatus 101 from a microphone provided in the image capturing apparatus 101, performs analog-digital conversion, and transmits the processed signals to an audio processing circuit 212. The audio processing circuit 212 performs processing related to sound such as optimization processing, on the input digital audio signals. The audio signals processed by the audio processing circuit 212 are then transmitted to the memory 213 by the control circuit 221. The memory 213 temporarily stores image signals and audio signals respectively obtained by the image processing circuit 207 and the audio processing circuit 212.

The image processing circuit 207 and the audio processing circuit 212 read out image signals and audio signals temporarily stored in the memory 213, encode the image signals and the audio signals, and generate compressed image signals and compressed audio signals, respectively. The control circuit 221 transmits these compressed image signals and compressed audio signals to a recording-and-reproduction circuit 218.

The recording-and-reproduction circuit 218 records, to a recording medium 219, the compressed image signals and compressed audio signals generated by the image processing circuit 207 and the audio processing circuit 212, other control data related to shooting, and the like. In addition, if audio signals are not compressed and encoded, the control circuit 221 transmits audio signals generated by the audio processing circuit 212 and compressed image signals generated by the image processing circuit 207, to the recording-and-reproduction circuit 218, and records these signals in the recording medium 219.

The recording medium 219 may be a recording medium incorporated in the image capturing apparatus 101 or a removable recording medium. Various types of data such as compressed image signals, compressed audio signals, and audio signals generated by the image capturing apparatus 101 can be recorded in the recording medium 219, and a medium having a larger capacity than the non-volatile memory 214 is generally used. Examples of the recording medium 219 include recording media of all formats such as a hard disk, an optical disk, a magneto-optical disk, a CD-R, a DVD-R, a magnetic tape, a non-volatile semiconductor memory, and a flash memory.

The recording-and-reproduction circuit 218 reads out (reproduces) compressed image signals, compressed audio signals, audio signals, various types of data, and programs that are recorded in the recording medium 219. The control circuit 221 then transmits the compressed image signals and compressed audio signals that have been read out, to the image processing circuit 207 and the audio processing circuit 212. The image processing circuit 207 and the audio processing circuit 212 temporarily store the compressed image signals and compressed audio signals in the memory 213, decode these signals using a predetermined procedure, and transmit the decoded signals to the video image output circuit 215 and an audio output circuit 216.

A plurality of microphones mounted in the image capturing apparatus 101 are connected to the audio input circuit 211, and the audio processing circuit 212 can detect the direction of sound on a plane on which the plurality of microphones are installed. This information is used in a search for a subject and automatic image capturing, which will be described later. Furthermore, the audio processing circuit 212 detects a specific audio command. Regarding the audio command, a plurality of audio commands registered in advance may be used, or a configuration may also be adopted in which the user can register specific audio in the image capturing apparatus. In addition, audio scene recognition is also performed. In audio scene recognition, audio scene determination is performed using a network trained in advance through machine learning based on a large amount of audio data. For example, a network for detecting a specific scene such as a scene where "cheers are raised", "clapping is performed", and "someone is speaking" is set in the audio processing circuit 212. Then, when a specific audio scene or a specific audio command is detected, a detection trigger signal is output to the control circuit 221. A power supply circuit 210 supplies power for causing the control circuit 221 to operate.

The audio output circuit 216 outputs an audio pattern that has been set in advance, from a speaker incorporated in the image capturing apparatus 101, for example, at the time of shooting and the like. An LED control circuit 222 controls an LED provided in the image capturing apparatus 101, using an illumination blink pattern set in advance, for example, at the time of shooting and the like. The video image output circuit 215 is constituted by a video image output terminal, for example, and transmits image signals in order to display a video image on an external display or the like connected to the image capturing apparatus 101. In addition, the audio output circuit 216 and the video image output circuit 215 may be one integrated terminal, for example, a terminal such as an HDMI (registered trademark, High-Definition Multimedia Interface) terminal.

A communication circuit 220 performs communication between the image capturing apparatus 101 and an external apparatus, and transmits and receives data such as audio signals, image signals, compressed audio signals, and compressed image signals. The communication circuit 220 also receives shooting start and shooting end commands, and control signals related to shooting such as control signals for pan-tilt operations, zoom drive, and the like, and drives the image capturing apparatus 101 according to an instruction from an external apparatus that can mutually communicate with the image capturing apparatus 101. In addition, information such as various parameters related to learning that are to be processed by a learning processing circuit 217 to be described later is transmitted/received between the image capturing apparatus 101 and the external apparatus. The communication circuit 220 is a wireless communication module such as an infrared ray communication module, a Bluetooth (registered trademark) communication module, a wireless LAN communication module, a wireless USB, or a GPS receiver.

Configuration of Image Capturing Apparatus and External Communication Device

Figure 3:
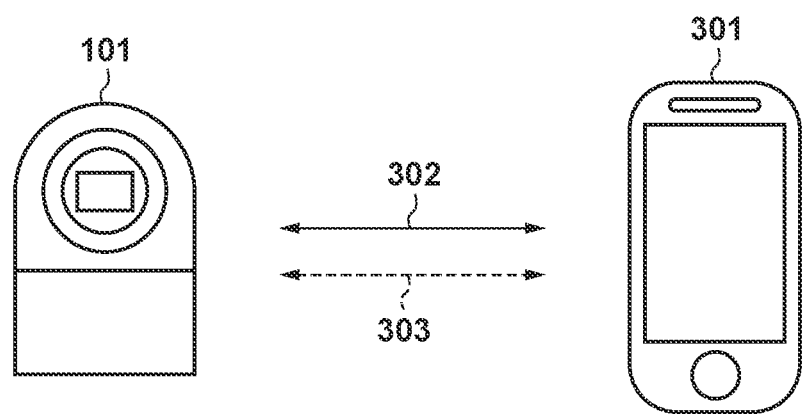
FIG. 3 is a diagram showing a configuration of an image capturing apparatus and an external apparatus.

FIG. 3 is a diagram showing a configuration example of a wireless communication system that includes the image capturing apparatus 101 and an external device 301. The image capturing apparatus 101 is a digital camera that has a shooting function, and the external device 301 is a smart device that includes a Bluetooth communication module and a wireless LAN communication module.

The image capturing apparatus 101 and the external device 301 can communicate with each other, for example, through communication 302 over a wireless LAN conforming to the IEEE802.11 standard series, and communication 303 over Bluetooth Low Energy (hereinafter referred to as "BLE") or the like, which involves a subordinate-superior relationship between, for example, a control station and a subordinate station. Note that a wireless LAN and BLE are examples of a communication technique, and each communication apparatus has two or more communication functions, and, for example, as long as one of the communication functions of performing communication based on a relationship between a control station and a subordinate station can control the other communication function(s), a different communication technique may be used. Note that first communication such as communication over a wireless LAN can be performed at a higher speed than second communication such as communication over BLE without loss of generality, and at least one of the power consumption and communicable distance of the second communication is smaller/shorter than that of the first communication.

Figure 4:
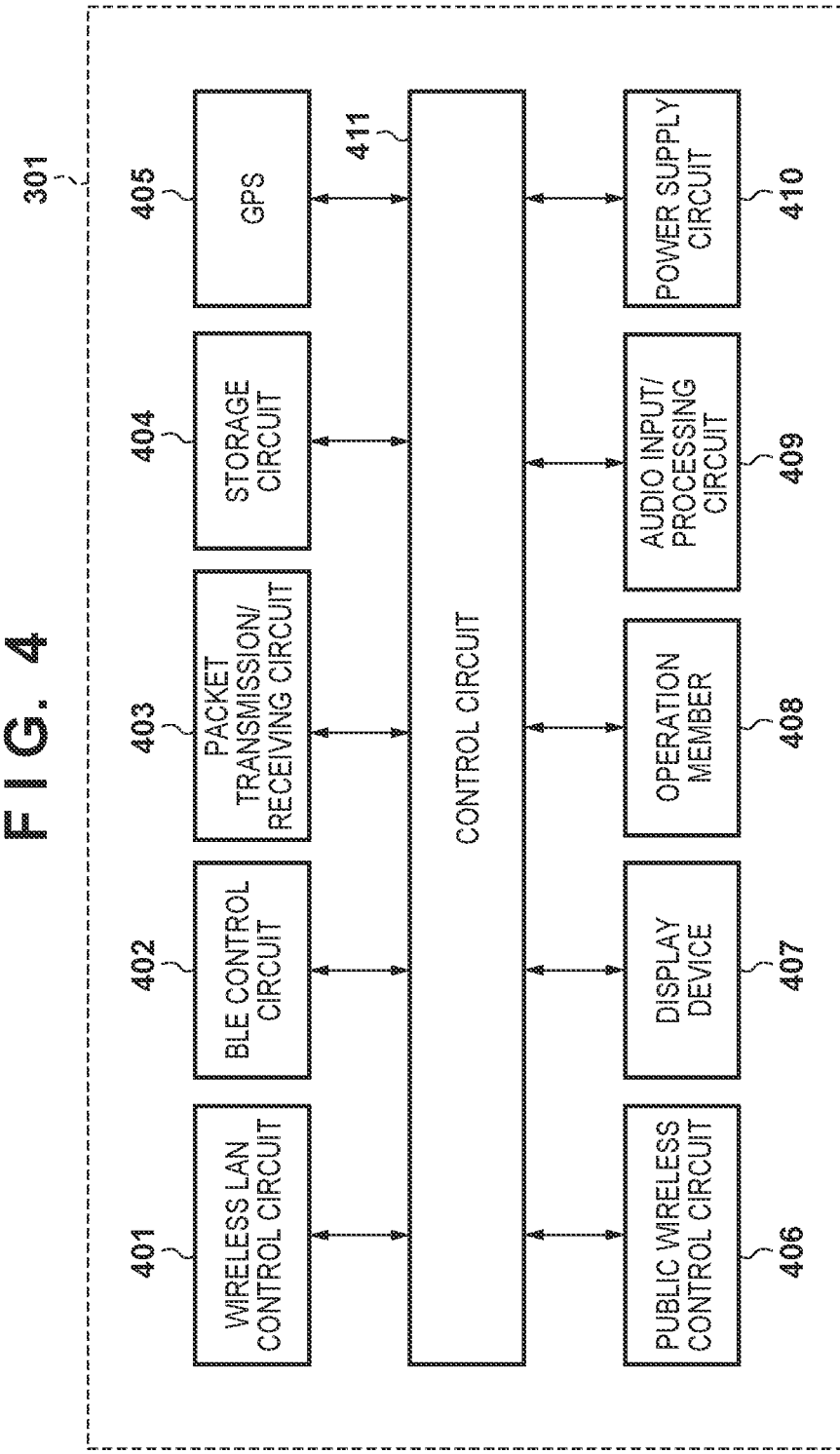
FIG. 4 is a diagram showing a configuration of an external apparatus.

A configuration of the external device 301 will be described with reference to FIG. 4. The external device 301 includes, for example, a wireless LAN control circuit 401 for wireless LAN, a BLE control circuit 402 for BLE, and, in addition, a public line control circuit 406 for public wireless communication. The external device 301 also includes a packet transmission/receiving circuit 403. The wireless LAN control circuit 401 performs RF control of wireless LAN, communication processing, and protocol processing related to communication over wireless LAN and a driver that performs various types of control of communication over a wireless LAN conforming to the IEEE802.11 standard series. The BLE control circuit 402 performs RF control of BLE, communication processing, and protocol processing related to communication over BLE and a driver that performs various types of control of communication over BLE. The public line control circuit 406 performs RF control of public wireless communication, communication processing, and protocol processing related to public wireless communication and a driver that performs various types of control of public wireless communication. Public wireless communication is, for example, communication conforming to the IMT (International Multimedia Telecommunications) standard, the LTE (Long Term Evolution) standard, or the like. The packet transmission/receiving circuit 403 performs processing for executing at least one of transmission and receiving of packets related to communication over wireless LAN and BLE and public wireless communication. Note that, in this example, a description will be given assuming that the external device 301 performs at least one of transmission and receiving of packets in communication, but a communication format other than packet switching, for example, line switching may be used.

The external device 301 also includes, for example, a control circuit 411, a storage circuit 404, a GPS receiving circuit 405, a display device 407, an operation member 408, an audio input/processing circuit 409, and a power supply circuit 410. The control circuit 411 performs overall control of the external device 301, for example, by executing a control program stored in the storage circuit 404. The storage circuit 404 stores, for example, a control program that is executed by the control circuit 411 and various types of information such as parameters necessary for communication. Various operations, which will be described later, are realized by the control circuit 411 executing a control program stored in the storage circuit 404.

The power supply circuit 410 supplies power to the external device 301. The display device 407 has, for example, a function of outputting visually recognizable information as is the case with an LCD or an LED, or outputting sound from a speaker or the like, and displays various types of information. The operation member 408 is, for example, a button or the like that accepts an operation performed on the external device 301 by the user. Note that the display device 407 and the operation member 408 may be constituted by, for example, a common member such as a touch panel.

A configuration may also be adopted in which the audio input/processing circuit 409 acquires sound made by the user, for example, from a general-purpose microphone incorporated in the external device 301, and acquires an operation instruction from the user through speech recognition processing.

In addition, an audio command is acquired from audio of the user, via a dedicated application in the external device 301. The audio command can be registered as a specific audio command for causing the audio processing circuit 212 of the image capturing apparatus 101 to recognize a specific audio command, via the communication 302 over wireless LAN.

A GPS (Global Positioning System) receiving circuit 405 is notified of and receives a GPS signal from a satellite, analyzes the GPS signal, and estimates the current position of the external device 301 (longitude-latitude information). Alternatively, regarding position estimation, the current position of the external device 301 may be estimated using a WPS (Wi-Fi Positioning System) or the like, based on information regarding a wireless network that is in the surroundings thereof. If acquired current GPS position information indicates that the external device 301 is located in a position range set in advance (in the range of a predetermined radius), the image capturing apparatus 101 is notified of movement information via the BLE control circuit 402, and the movement information is used for parameters for automatic image capturing and automatic editing, which will be described later. In addition, if GPS position information includes a position change that is larger than or equal to a predetermined value, the image capturing apparatus 101 is notified of movement information via the BLE control circuit 402, and the movement information is used for parameters for automatic image capturing and automatic editing to be described later.

As described above, the image capturing apparatus 101 and the external device 301 transmit/receive data to/from each other through communication that uses the wireless LAN control circuit 401 and the BLE control circuit 402. For example, data such as audio signals, image signals, compressed audio signals, and compressed image signals is transmitted and received. Also, instructions for an operation such as shooting are given, audio command registration data is transmitted, and a notification of predetermined position detection and location movement based on GPS position information is made, from the external device 301 to the image capturing apparatus 101. In addition, learning data is transmitted/received via a dedicated application in the external device 301.

Sequence of Image Capturing Operation

Figure 5:
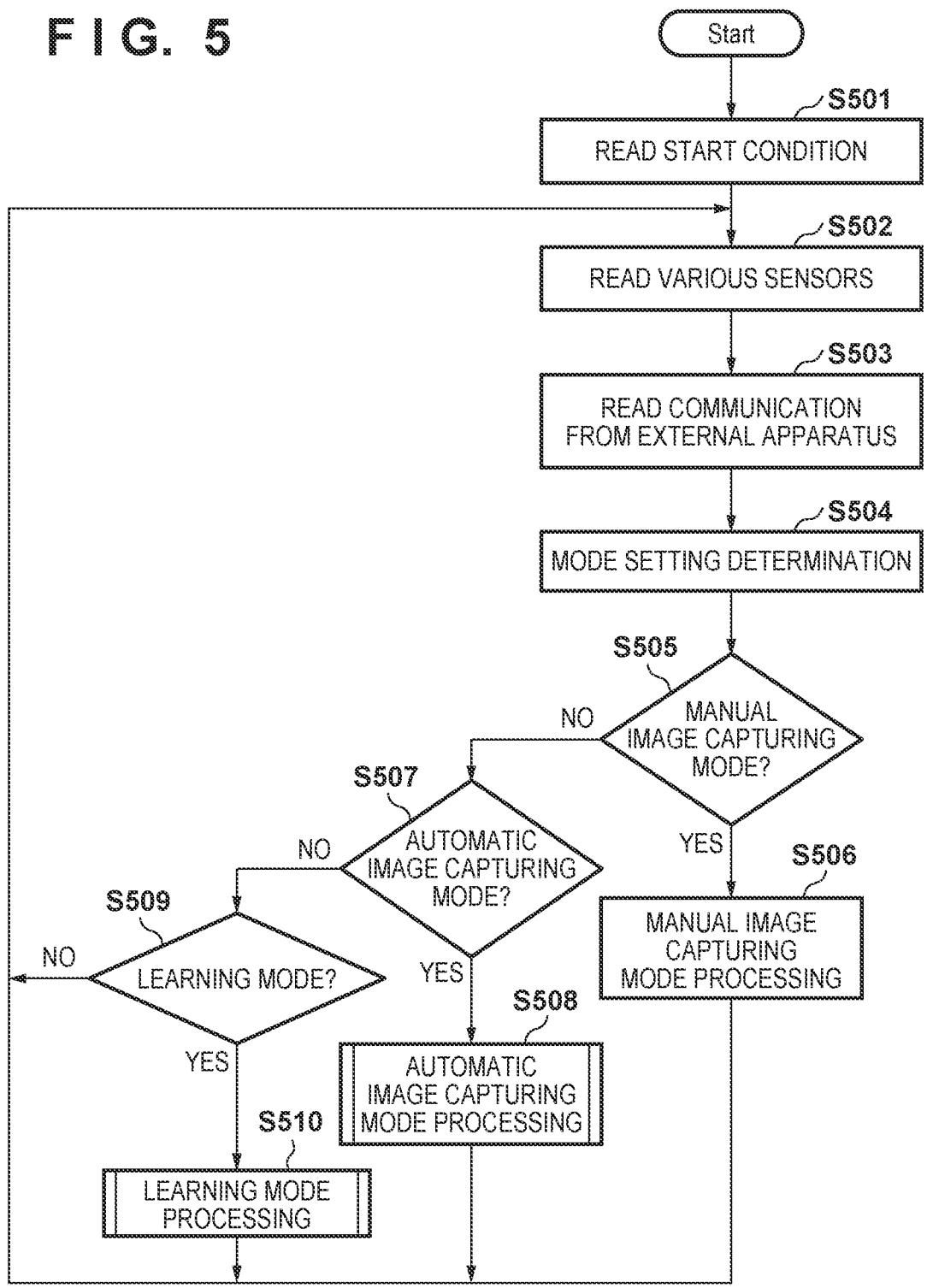
FIG. 5 is a flowchart illustrating operations of a control circuit.

FIG. 5 is a flowchart illustrating an example of operations that the control circuit 221 of the image capturing apparatus 101 in this embodiment is in charge of.

When the user performs an operation on a power supply button provided on the image capturing apparatus 101, the power supply circuit 210 supplies power to the control circuit 221 and the blocks of the image capturing apparatus 101. When power is supplied, the processing in FIG. 5 starts. In step S501 (hereinafter, "step S" is abbreviated as "S"), a start condition is read. In this embodiment, the power supply button may be manually pressed to start power supply, or power supply may be started in response to an instruction from an external device (for example, 301) made through external communication (for example, BLE communication). Alternatively, power supply may be started by detecting the user tapping on the image capturing apparatus 101, or power supply may also be started by detecting input of a specific audio command. In addition, the start condition that is read here is used as one parameter element at the time of a subject search and automatic image capturing, but this will be described later. When reading of the start condition ends, the procedure advances to S502.

In S502, detection values of various sensors are read. Here, the detection values of sensors that are read include detection values of sensors that detect vibration, such as the gyro sensor and the acceleration sensor of the apparatus shake detection circuit 209. The detection values also include rotation positions of the tilt rotation unit 104 and the pan rotation unit 105. Furthermore, the detection values also include an audio level that is detected by the audio processing circuit 212, a detection trigger of specific speech recognition, and a detection value of a sound direction.

In addition, although not illustrated in FIGS. 1 to 4, information is also acquired by sensors that detect environment information. For example, a temperature sensor that detects the temperature in the surroundings of the image capturing apparatus 101 in a predetermined cycle and a pneumatic sensor that detects changes in the air pressure in the surroundings of the image capturing apparatus 101 are included. In addition, an illuminance sensor that detects the brightness in the surroundings of the image capturing apparatus 101, a humidity sensor that detects the humidity in the surroundings of the image capturing apparatus 101, a UV sensor that detects the amount of ultraviolet light in the surroundings of the image capturing apparatus 101, and the like may also be included. Detected temperature information, air pressure information, brightness information, humidity information, and UV information, as well as a temperature change amount, an air pressure change amount, a brightness change amount, a humidity change amount, an ultraviolet light change amount, and the like calculated from the various types of detected information at a predetermined time interval using a change rate are used for determination in automatic image capturing to be described later, and the like.

Once the detection values of the various sensors have been read in S502, the procedure advances to S503. In S503, detection is performed as to whether or not a communication instruction has been given from an external apparatus, and if a communication instruction has been given, communication with the external apparatus is performed. For example, a remote operation is received from the external device 301 via wireless LAN or BLE, and data such as audio signals, image signals, compressed audio signals, and compressed image signals are transmitted and received. In addition, reading is performed as to whether or not the external device 301 has given an operation instruction for the image capturing apparatus 101 to perform shooting and the like, has transmitted audio command registration data, has made a notification regarding predetermined position detection and movement that are based on GPS position information, and has given an instruction to transmit/receive learning data.

In addition, various sensors that detect the above-described environment information may be mounted in the image capturing apparatus 101, but may be mounted in the external device 301, in which case, environment information is also read via BLE. Once reading has been performed from the external apparatus through communication in S503, the procedure advances to S504.

In S504, mode setting determination is performed. A mode that is set in S504 is determined and selected from those listed below.

1. Manual Image Capturing Mode

Mode Determination Condition

If it is detected that a command to set a manual image capturing mode has been transmitted from the external device 301, the manual image capturing mode is set.

Processing in Mode

In manual image capturing mode processing (S506), pan-tilt or zoom is driven according to content input by the user, and shooting of a still image and recording of a moving image are started according to a user's shooting instruction.

2. Automatic Image Capturing Mode

Mode Determination Condition

If it is determined that automatic image capturing is to be performed, the automatic image capturing mode is set based on various pieces of detection information (images, sound, time, vibration, location, a change in a human body, an environmental change) set through learning to be described later, the time that has elapsed from when the image capturing mode changed to an automatic image capturing mode, past shooting information, and the like.

Processing in Mode

In automatic image capturing mode processing (S508), pan-tilt and zoom are driven based on various pieces of detection information (images, sound, time, vibration, location, a change in a human body, an environmental change), and a subject is automatically searched for. Then, if it is determined that the timing when shooting that matches a user's taste can be performed has come, shooting is automatically performed. Note that, if a shooting instruction has been given from the user, shooting is performed according to the instruction.

3. Learning Mode

Mode Determination Condition A learning mode is set if it is determined that learning is to be performed, based on the time that has elapsed from when learning processing was last performed, information associated with an image that can be used for learning, the number of pieces of training data, and the like. Alternately, also if an instruction to set learning parameters is given from the external device 301 via communication, the learning mode is set.

Processing in Mode

In learning mode processing (S510), learning that matches a user's taste is performed. Learning that matches a user's taste is performed based on information regarding operations (performed) in the external device 301, notification of training data from the external device 301, and the like, using a neural network. Examples of the information regarding operations (performed) in the external device 301 include information regarding acquisition of an image from the image capturing apparatus 101, information regarding an instruction to perform manual editing given via a dedicated application, and information regarding a determination value input by the user for an image in the image capturing apparatus.

Note that automatic image capturing mode processing and learning mode processing will be described later in detail.

In S505 in FIG. 5, determination is performed as to whether or not the manual image capturing mode was set in the mode setting determination in S504. If it is determined that the manual image capturing mode is set, the procedure advances to S506, and the manual image capturing mode processing is performed. In the manual image capturing mode processing, as described above, the image capturing apparatus 101 is driven according to the content of input made by the user. When the processing ends, the procedure returns to S502.

On the other hand, if it is determined in S505 that the manual image capturing mode is not set, the procedure advances to S507, and determination is performed as to whether or not the automatic image capturing mode is set in the mode settings, and, if the automatic image capturing mode is set, the procedure advances to S508, and the automatic image capturing mode processing is performed. When the processing ends, the procedure returns to S502. If it is determined in S507 that the automatic image capturing mode is not set in the mode settings, the procedure advances to S509.

In S509, determination is performed as to whether or not the learning mode is set in the mode settings, and if the learning mode is set, the procedure advances to S510, and the learning mode processing is performed. When the processing ends, the procedure returns to S502, and the processing is repeated. If it is determined in S509 that the learning mode is not set, the procedure returns to S502, and the processing is repeated.

Automatic Image Capturing Mode Processing

Figure 6:
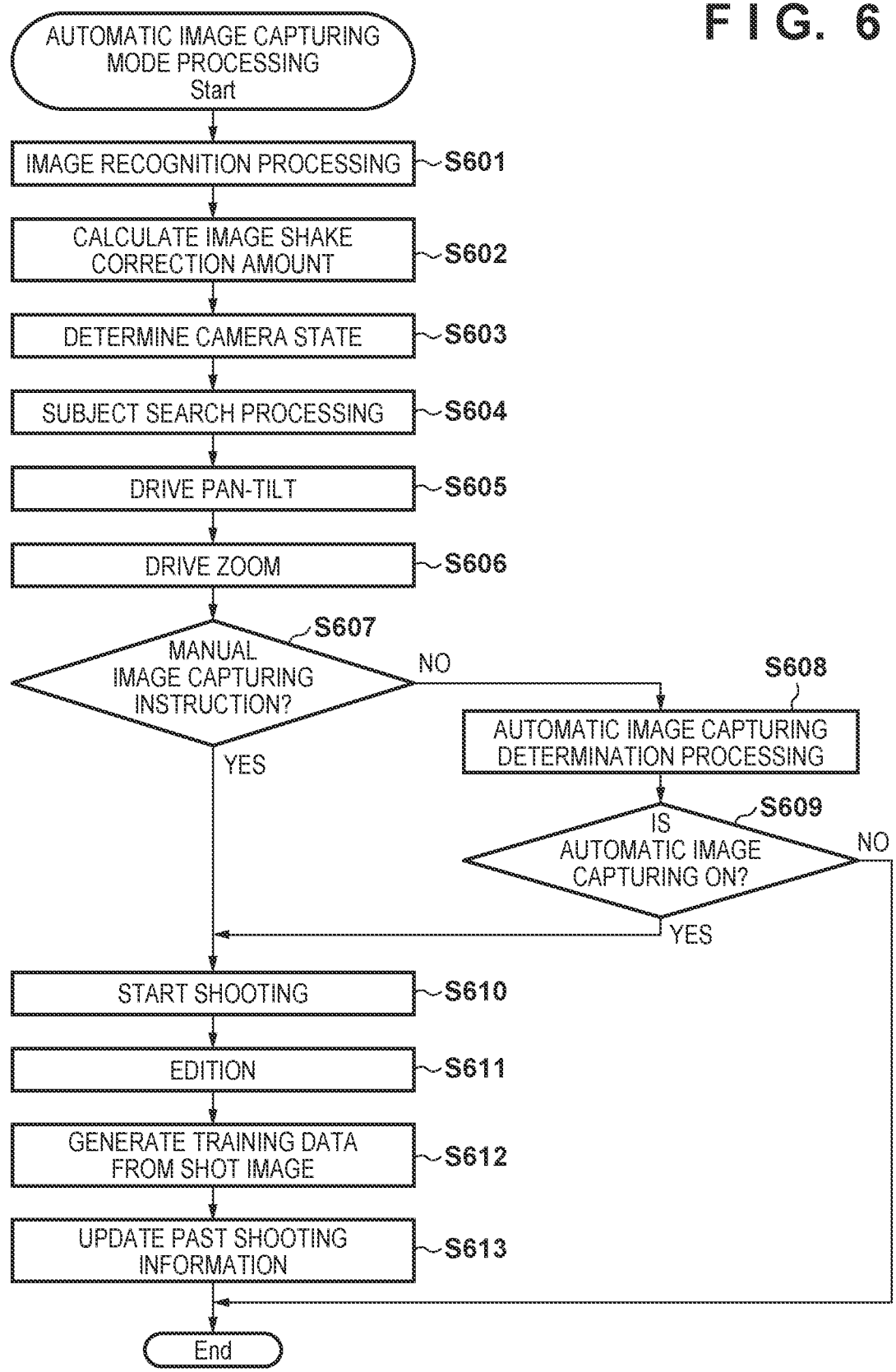
FIG. 6 is a flowchart illustrating automatic image capturing mode processing.

The automatic image capturing mode processing in S508 in FIG. 5 will be described in detail with reference to FIG. 6. As described above, the control circuit 221 of the image capturing apparatus 101 in this embodiment controls the following processing.

In S601, the image processing circuit 207 performs image processing on image signals captured by the image capturing unit 206, and generates an image for subject recognition. Subject recognition such as recognition of a person and an object is performed on the generated image.

When recognition of a person is performed, the face and body of a subject are detected. In face detection processing, a pattern for determining a face of a person is defined in advance, and, out of regions included in a captured image, a portion that matches this pattern can be detected as a face image of a person. In addition, reliability that indicates the probability of the portion being the face of a subject is also calculated at the same time. The reliability is calculated based on the size of the face region in the image, the degree of matching to a face pattern, and the like.

Similarly, in object recognition, it is possible to recognize an object that matches a pattern registered in advance. In addition, there is, for example, a method for extracting a feature subject using a method that uses histograms of hue, saturation, and the like in a captured image. In this case, regarding an image of a subject captured within a shooting field angle, processing for dividing a distribution derived from the histograms of hue, saturation, and the like, into a plurality of sections, and classifying a captured image for each of the sections is executed.

For example, histograms of a plurality of color components are created for a captured image, a parabolic distribution range thereof is sectioned, and the captured image is classified in a region belonging to a combination in the same section, and the image region of a subject is recognized.

By calculating an evaluation value for each image region of a recognized subject, the image region of the subject with the highest evaluation value can be determined as a main subject region.

Each piece of subject information can be obtained from a captured image using the above-described method.

In S602, a shake correction amount is calculated. Specifically, first, the absolute angle of an orientation change of the image capturing apparatus 101 is calculated based on angular speed and acceleration rate information acquired by the apparatus shake detection circuit 209. A shake correction angle for moving the tilt rotation unit 104 and the pan rotation unit 105 in an angle direction in which the absolute angle is cancelled out is then obtained, and is set as a shake correction amount.

In S603, the state of the image capturing apparatus 101 is determined. Determination is performed as to what vibration/movement state the image capturing apparatus 101 is currently in, using an angle and a movement amount detected based on angular speed information, acceleration rate information, GPS position information, and the like. For example, when the image capturing apparatus 101 is mounted in a vehicle and shooting is performed, subject information such as surrounding landscape changes largely depending on the distance of movement.

Therefore, determination is performed as to whether or not the image capturing apparatus 101 is in a "moving-in-vehicle state", namely a state of being mounted in a vehicle or the like and moving at a high speed, and the result can be used for an automatic subject search to be described later.

In addition, determination is performed as to whether or not a change in the angle is large, and determination is performed as to whether or not the image capturing apparatus 101 is in a "placed-to-shoot" state where there is almost no swinging angle. In the "placed-to-shoot" state, it may be considered that there is no change in the angle of the image capturing apparatus 101 itself, and thus subject search for the "placed-to-shoot" state can be performed. Also, if the angle change is relatively large, it is determined that the image capturing apparatus 101 is in a "held-in-hand" state, and subject search for the "held-in-hand" state can be performed.

In S604, subject search processing is performed. The control circuit 221 divides the entire area centered on the position of the image capturing apparatus 101 (the origin O in FIG. 1B indicates the position of the image capturing apparatus). For each divided area, an importance level that indicates a priority order in which a search is performed is calculated according to a subject in the area and a scene situation of the area.

An importance level that is based on the situation of a subject is calculated based on, for example, the number of persons in the area, the size of the face of a person, the orientation of a face, probability of face detection, facial expression of a person, and a personal authentication result of a person. In addition, an importance level that is based on the situation of a scene is calculated based on, for example, a general object recognition result, a scene determination result (blue sky, backlit scene, evening view, etc.), the level of sound that is heard from the direction of the area and a speech recognition result, movement detection information in the area, and the like. In addition, in determination of the state of the image capturing apparatus 101 (S603), a vibration state of the image capturing apparatus 101 is detected, and a configuration can be adopted in which the importance level also changes according to a vibration state. For example, if it is determined that the image capturing apparatus 101 is in the "placed to shoot" state, and, if the face of a specific person has been detected, an importance level is determined to be high so as to perform a subject search centered on a subject with high priority (for example, the user of the image capturing apparatus) from among subjects registered through face authentication. In addition, automatic image capturing to be described later is also performed with priority given to the face of a specific person, and, even if the user of the image capturing apparatus 101 wears and carries the image capturing apparatus, and the time during which shooting is performed is long, it is possible to obtain a large number of images of the user by detaching and placing the image capturing apparatus on a desk, for example. At this time, since a search can be performed through pan-tilt operations, it is possible to obtain images of the user, group photos of a large number of faces, and the like by simply randomly placing the image capturing apparatus 101 without considering an angle at which the image capturing apparatus is placed and the like.

Note that, with only the above condition, for as long as there is no change in the areas, the area with the highest importance level remains the same, and, as a result, the area that is searched will never change. In view of this, the importance level is changed according to past shooting information. Specifically, the importance level of an area continuously specified as a search area for a predetermined time may be decreased, or the importance level of an area acquired by performing shooting in S610, which will be described later, may be decreased for a predetermined time.

When the importance levels of the respective areas are calculated as described above, an area with a high importance level is determined as an area to be searched. Then, a pan-tilt search target angle required for capturing the area to be searched within a field angle is calculated.

In S605, pan-tilt driving is performed. Specifically, a pan-tilt drive amount is calculated by adding a drive angle in control sampling based on an image blur correction amount and the pan-tilt search target angle. Drive control of the tilt rotation unit 104 and the pan rotation unit 105 is then performed using the barrel rotation drive circuit 205.

In S606, the zoom unit 201 is controlled so as to drive the zoom. Specifically, the zoom is driven in accordance with the state of the subject to be searched for determined in S604. For example, if the subject to be searched for is the face of a person, and the size of a face in an image is too small, there is a risk that the size is smaller than the detectable minimum size, the face cannot be detected, and sight of the face is lost. In such a case, control is performed such that the size of the face in the image is increased, by moving the lens to the telephoto side. On the other hand, if the size of the face in the image is too large, the subject is likely to move out of the field angle due to movement of the subject and the image capturing apparatus 101 itself. In such a case, control is performed such that the size of the face on the screen is reduced, by moving the lens to the wide angle side. It is possible to maintain the state suitable for tracking a subject by performing zoom control in this manner.

In S604 to S606, a method for performing a subject search through pan-tilt operations and zoom drive has been described, but a subject search may also be performed by an image capturing system for shooting an omnidirectional image at a time using a plurality of wide-angle lenses. In the case of an omnidirectional camera, when image processing such as subject detection is performed using all of the signals obtained through image capturing as an input image, a huge amount of processing is required. In view of this, a configuration is adopted in which a portion of the image is extracted, and processing for searching for a subject is performed in the range of the extracted image. Similar to the above-described method, an importance level is calculated for each area, an extraction position is changed based on the importance level, and determination of automatic image capturing to be described later is performed. This enables a reduction in the power that is consumed in image processing and a high-speed subject search.

In S607, determination is performed as to whether or not a shooting instruction has been given (manually) from the user in a state where the automatic image capturing mode is set, and, if a shooting instruction has been given, the procedure advances to S610. At this time, the shooting instruction given (manually) by the user may be given as a result of pressing a shutter button, softly hitting (tapping) the case of the image capturing apparatus 101 using a finger or the like, inputting an audio command, receiving an instruction from an external apparatus, or the like. A shooting instruction given through a tap operation refers to a shooting instruction method in which vibration when the user taps the case of the image capturing apparatus 101 is detected by the apparatus shake detection circuit 209 as an acceleration rate of a high-frequency that continues for a short period, and is used as a trigger for shooting. Input of an audio command refers to a shooting instruction method in which, when the user says a predetermined phrase for instructing shooting (for example, "take a photo"), the audio processing circuit 212 recognizes the audio, and uses the audio as a trigger for shooting. A shooting instruction from an external apparatus refers to a shooting instruction method in which a shutter instruction signal transmitted from a smart phone or the like that is Bluetooth-connected to the image capturing apparatus 101, via a dedicated application is used as a trigger.

If it is determined in S607 that there is no shooting instruction, the procedure advances to S608, and automatic image capturing determination is performed. In the automatic image capturing determination, determination is performed as to whether or not to perform automatic image capturing.

Figure 7:
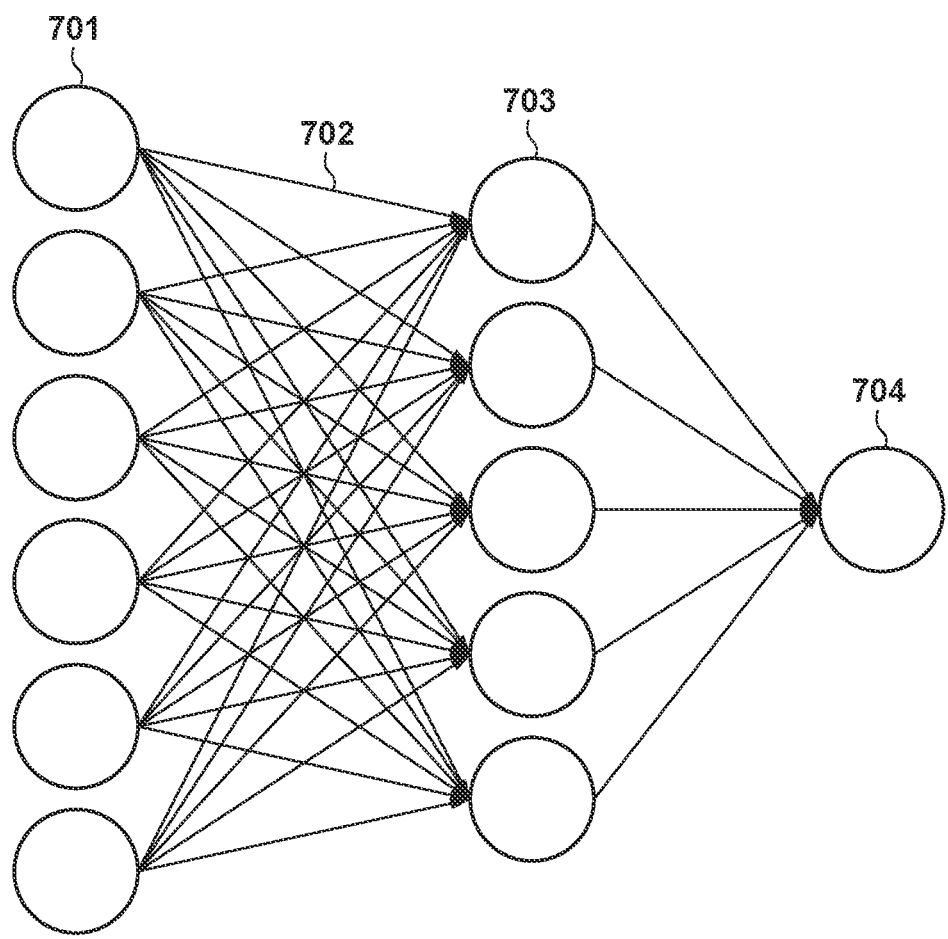
FIG. 7 is a diagram illustrating a neural network.

Determination as to whether or not to perform automatic image capturing is performed based on a neural network that is a mechanism for machine learning. FIG. 7 shows an example of a network that uses a multi-layer perceptron, as an example of a neural network. A neural network is used for estimating an output value from an input value, and input values and output values that are model values for the inputs are learned in advance, and thus it is possible to infer an output value for a new input value based on the learned model values. Note that a learning method will be described later.

A circle denoted by reference numeral 701 in FIG. 7 and circles aligned vertically below the circle 701 indicate neurons of an input layer, a circle denoted by reference numeral 703 and circles aligned vertically below the circle 703 indicate neurons of an intermediate layer, and a circle denoted by reference numeral 704 indicates a neuron of an output layer. Arrows including an arrow denoted by reference numeral 702 indicate a connection between the neurons. In determination that is based on a neural network, feature amounts that are based on a subject that appears within the current field angle, a scene, and the state of the image capturing apparatus are provided as input to the neurons of the input layer, calculation that is based on a feed forward rule of the multi-layer perceptron is performed, and values output from the output layer are obtained. Then, if the output values are larger than or equal to a threshold, it is determined that automatic image capturing is to be carried out.

Note that a general object recognition result and a face detection result at the current zoom magnification and the current field angle, the number of faces that appear in the current field angle, a degree of smiling of a face/a degree to which eyes of a face are closed, a face angle, a face authentication ID number, the angle of the line of sight of a subject person, a scene determination result, a detection result of a specific construct, and the like are used as features of a subject. In addition, the time that has elapsed from the previous shooting, the current time, GPS position information and a change amount from the previous shooting position, the current audio level, a person that is speaking, whether or not clapping and cheers are raised, and the like may also be used. In addition, vibration information (acceleration rate information and the state of the image capturing apparatus), environment information (temperature, air pressure, illuminance, humidity, and the amount of ultraviolet light), and the like may also be used. These features are converted into numerical values in a predetermined range, and are added as feature amounts to the neurons of the input layer. Therefore, the number of required neurons of the input layer is the same as the number of feature amounts described above.

Note that an output value of this determination that is based on a neural network changes as a result of the coupling weight between neurons changing due to learning processing to be described later, and the result of the determination can be adapted to a learning result.

In addition, determination as to whether automatic image capturing is to be performed also changes according to the start condition read in S501 in FIG. 5. For example, it is highly probable that a start that is based on tap detection and a start that is based on a specific audio command are operations when the user desires to immediately perform shooting. In view of this, settings are set so as to increase the shooting frequency.

In S609, if a determination is made in automatic image capturing determined in S608 to perform shooting, the procedure advances to S610, and if not, image capturing mode processing is ended, and the procedure advances to S502 in FIG. 5.

In S610, shooting is started. At this time, in manual image capturing, shooting of a still image is performed or shooting is performed using a shooting method manually set by the user, and, in automatic image capturing, shooting is started at the timing determined in S608. At this time, autofocus control is performed by the focus drive control circuit 204. In addition, exposure control is performed such that brightness of the subject is appropriate, using a diaphragm control circuit, a sensor gain control circuit, and a shutter control circuit that are not illustrated. Furthermore, after shooting, in the image processing circuit 207, various types of image processing such as automatic white balancing processing, noise reduction processing, and gamma correction processing are performed, and an image is generated.

Note that, if a predetermined condition is satisfied at the time of this shooting, the image capturing apparatus 101 may take a measure of notifying a person targeted for shooting that shooting is to be performed, and then perform shooting. In the notification method, for example, audio from the audio output circuit 216 and LED illumination light from the LED control circuit 222 may be used, and a motion operation for visually guiding the line of sight of the subject by driving the pan-tilt may also be used. Examples of the predetermined condition include the number of faces within the field angle, a degree of smiling/a degree to which eyes of a face are closed, the angle of a line of sight and the face angle of a subject person, a face authentication ID number, the number of persons registered for personal authentication, and the like. Also, a general object recognition result at the time of shooting, a scene determination result, a time that has elapsed from the previous shooting, a shooting time, whether or not the current position that is based on GPS information is a scenic spot, the audio level at the time of shooting, whether or not there is a person that is speaking, whether or not clapping or cheers are raised, and the like may also be used. In addition, vibration information (acceleration rate information and the state of the image capturing apparatus), environment information (temperature, air pressure, illuminance, humidity, and the amount of ultraviolet light), and the like may also be used. By performing a shooting notification based on these conditions, it is possible to obtain a preferred image in which the subject is looking at the camera in a scene with a higher importance.

In addition, a configuration may also be adopted in which a plurality of predetermined conditions are provided, and audio, an illumination method of the LED (color, blinking time, etc.), or a pan-tilt motion method (how to move and drive speed) is changed according to each of the conditions.

In S611, editing processing such as processing of the image generated in S610 and addition of the image to a moving image is performed. Specific examples of image processing include trimming processing that is based on the face of a person and a focal position, rotation processing of an image, processing for adding various effects such as an HDR (High Dynamic Range) effect, a bokeh effect, and a color conversion filter effect. In image processing, a plurality of images may be generated based on the image generated in S610, by combining the above-described processes, and be recorded separately from the image generated in S610. In addition, in moving image processing, processing for adding a moving image or a still image that has been shot, to a generated editing moving image while applying special effect processing of sliding, zooming, and fading may be performed. Also in editing in S611, determination can be performed on information regarding a shot image or various types of information detected before shooting, based on the neural network, and determination can also be performed on an image processing method. In addition, in this determination processing, the determination condition can be changed through learning processing to be described later.

In S612, processing for generating training data from a shot image is performed. Here, information that is used for learning processing to be described later is generated, and is recorded. Specific examples of the information include zoom magnification during shooting, a general object recognition result during shooting, a face detection result, the number of faces in a shot image, the degree of smiling of a face/the degree to which eyes of a face are closed, a face angle, a face authentication ID number, and the angle of the line of sight of a subject person, in the currently shot image. In addition, a scene determination result, the time that has elapsed from the previous shooting, a shooting time, GPS position information and the change amount from the previous shooting position, an audio level at the time of shooting, a person that is speaking, whether or not clapping and cheers are raised, and the like are also included. In addition, vibration information (acceleration rate information and the state of the image capturing apparatus), environment information (temperature, air pressure, illuminance, humidity, and the amount of ultraviolet light), a moving image shooting time, whether or not shooting is performed in response to a manual image capturing instruction, and the like may also be included. Furthermore, a score that is output from the neural network, and is acquired by converting a user's taste in images into a numerical value is also calculated.

These pieces of information are generated, and are recorded as tag information to a shot image file. Alternatively, such information may be written to the non-volatile memory 214, or may be stored in the recording medium 219 in a format where information regarding shot images (captured images) is listed as so-called catalog data.

In S613, past shooting information is updated. Specifically, from among the number of shot images for each area mentioned in the description of S608, the number of shot images for each person registered in the personal authentication, the number of shot images for each subject recognized in general object recognition, and the number of shot images for each scene in scene determination, the number of images corresponding to an image shot the most recently is increased by 1.

Learning Mode Processing

Next, learning that matches a user's taste in this embodiment will be described.

In this embodiment, the neural network as shown in FIG. 7 is used, and the learning processing circuit 217 performs learning that matches a user's taste using a machine learning algorithm. The learning processing circuit 217 uses NVIDIA Jetson TX2, for example. A neural network is used for estimating an output value from an input value, and can infer an output value for a new input value by learning actual input values and actual output values in advance. By using a neural network, learning that matches a user's taste can be performed for the above-described automatic image capturing and subject search.

In addition, subject registration (face authentication, general object recognition, etc.), which is used as feature data that is input to the neural network, is also performed.

Learning for automatic image capturing in this embodiment will be described. In automatic image capturing, learning for automatically shooting an image that matches a user's taste is performed. As described with reference to the flowchart in FIG. 6, processing for generating training data is performed after shooting (S612). Images to be learned are selected using a method to be described later, and are learned as a result of changing the coupling weight between neurons of the neural network based on training data included in the images.

Next, learning methods will be described. The learning methods include "learning within an image capturing apparatus" and "learning performed in cooperation with a communication device". The method of "learning within an image capturing apparatus" will be described below.

"Learning within an image capturing apparatus" in this embodiment is performed using one of the following methods.

1. Learning that is Performed Using Detection Information when Shooting Instruction is Given by User As described in S607 to S613 in FIG. 6, in this embodiment, the image capturing apparatus 101 can perform two types of image capturing, namely manual image capturing and automatic image capturing. If a shooting instruction (performed based on three determinations as described above) has been given in S607 through a manual operation, information indicating that a shot image is a manually shot image is added in S612. In addition, if it was determined in S609 that automatic image capturing was ON and shooting was performed, information indicating that a shot image is an automatically shot image is added in S612. In addition, the information indicating that a shot image is a manually shot image is also added to the image shot in the manual image capturing mode in S506.

Here, if the shot image is a manually shot image, it is highly likely that the image was shot based on a subject, a scene, a place, and a time interval that match a user's taste. Thus, learning is performed based on the feature data obtained during manual image capturing and training data of the shot image.

In addition, learning is performed regarding extraction of feature amounts in the shot image, registration of personal authentication, registration of facial expression for each individual, and registration of combinations of people, from detection information during manual image capturing. In addition, learning is performed, for example, such that degrees of importance of a nearby person and object are changed based on facial expression of a subject recorded in personal registration, from detection information during subject search.

2. Learning that is Performed Based on Delete Operation Performed by User

An image deleted according to an operation performed by the user can also be used for learning. When an image stored in the recording medium 219 or the non-volatile memory 214 is deleted according to an operation performed by the user, there is the possibility that the image has been determined to be of low value. Furthermore, when it is conceivable that the reason for the value of the image being low is that learning of the neural network that is used for automatic image capturing is immature, a deleted image and detection information associated with the image can be used for learning as a sample of an unfavorable scene. Accordingly, it is possible to suppress automatic image capturing of an unfavorable scene.

Figure 11:
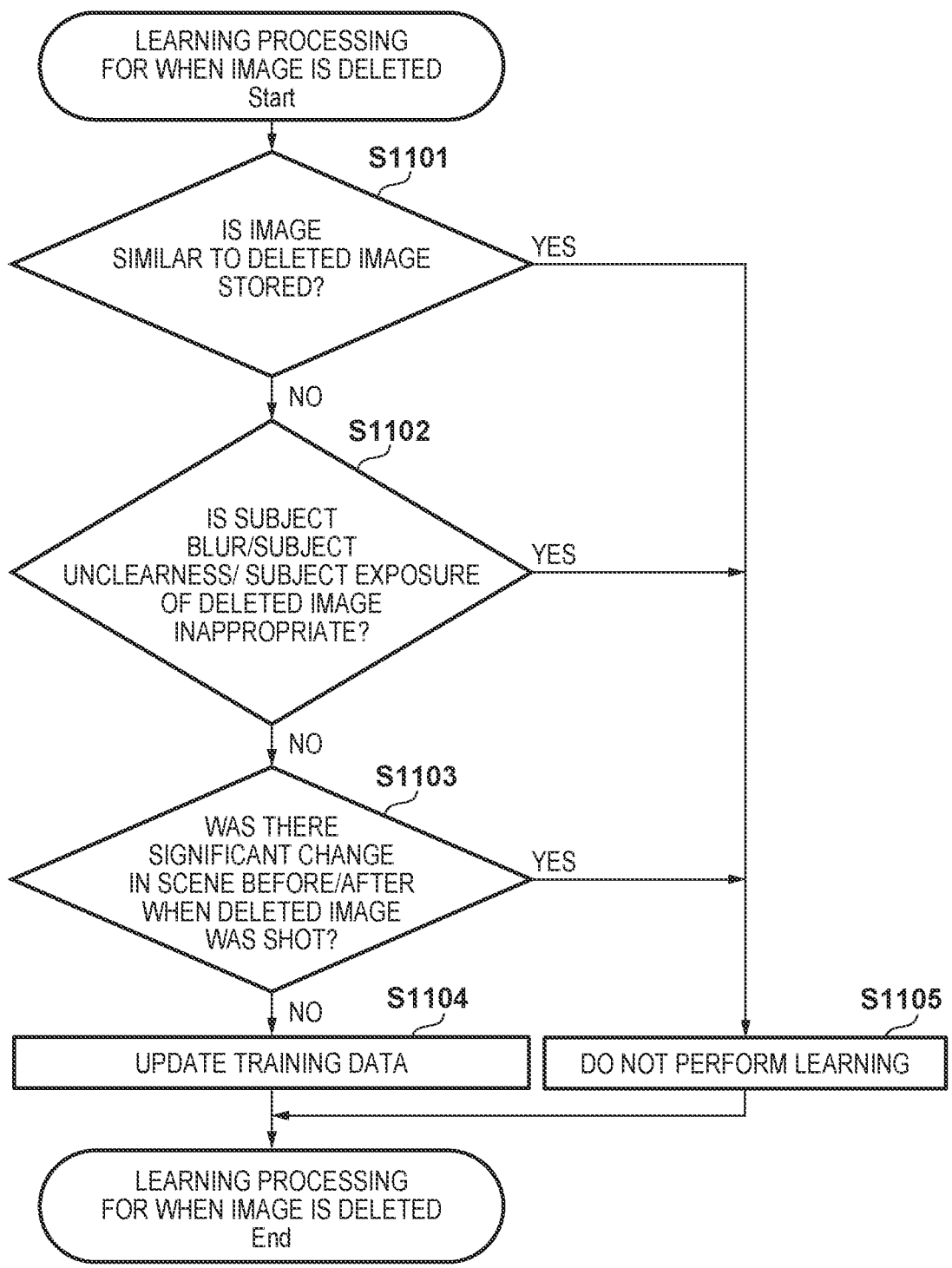
FIG. 11 is a flowchart for illustrating learning processing that is based on a delete operation.

Learning processing that is based on a delete operation of the user will be described with reference to the flowchart in FIG. 11. FIG. 11 is a flowchart showing learning processing when the user performs an operation of deleting an image. This learning processing is performed when an image is deleted by the user performing an operation. The operation performed by the user may be a direct operation on the image capturing apparatus 101, or may be an operation on a smart device or an accessory device that is linked with the image capturing apparatus to give a delete instruction through communication.

In S1101, determination is performed as to whether or not an image that is similar to a deleted image is present in the recording medium 219 or the non-volatile memory 214. If a similar image is present, it can be determined that a relative value of the deleted image decreased and was deleted since there is a similar image in the recording medium 219 or the non-volatile memory 214, in other words the absolute evaluation of the deleted image is not necessarily low.

The determination method may be a (similarity determination) method for obtaining a similarity by directly comparing a deleted image with image data of a comparison image in the recording medium 219 or the non-volatile memory 214, or a method for obtaining a similarity by comparing detection information associated with images.

Examples of a method for comparing images and obtaining a similarity will be described below. First, a plurality of feature points (a group of feature points) are extracted from images to be compared, through feature point extraction processing. Any method such as SIFT (Scale-Invariant Feature Transform) and FAST (Features from Accelerated Segment Test) can be used for feature point extraction processing. Next, feature point matching processing for pairing feature points that are similar between images is performed, and settings are set such that a higher similarity is output the higher the number of pairs of matched feature points is.

The method for comparing images and obtaining a similarity is not limited thereto, and, for example, a neural network trained to output a similarity of two input images may be used.

In addition, as an example of a method for comparing detection information associated with images and obtaining a similarity, a method for calculating an Euclidean distance between two pieces of detection information expressed as vectors, and determining a higher similarity as the distance between the two pieces of detection information decreases is conceivable. A distance that is calculated is not limited to a Euclidean distance, and a distance of any definition may be used. In addition, a distance calculator optimized for determining a similarity of detection information through distance measurement learning or the like may also be used. In addition, a configuration may also be adopted in which images are compared for which at least one of shooting time information and shooting position information associated with image data is different from at least one of those associated with the deleted image by a predetermined threshold or smaller.

If an image whose similarity is determined as being larger than a predetermined threshold through determination processing as described above is present in the recording medium 219 or the non-volatile memory 214, the procedure advances to S1105, and otherwise the procedure advances to S1102.

In S1102, determination is performed as to whether or not the deleted image is an image shot in a state where focal position control and exposure control of the image capturing apparatus 101 are inappropriate. If the image was shot in a state where focal position control and exposure control were inappropriate, which made the subject unclear or the subject blurred, and lead to inappropriate exposure of a subject, it can be determined that this is the reason for the user's low evaluation.

A method that is based on edge detection described in Japanese Patent Laid-Open No. 2015-170306 may be used as a method for performing determination on subject unclearness and subject blur. In addition, a neural network trained so as to output, for an input image, data on the presence or absence of subject unclearness and subject blur may also be used.

For example, a method for using a luminance histogram calculated based on an image may be used as a method for determining whether or not exposure of a subject is appropriate. If the luminance histogram is extremely weighted toward low luminance or high luminance, it is possible to determine that the image of the subject has not been captured with appropriate brightness. Also, a neural network trained so as to output, for an input image, data on whether or not brightness of a subject is appropriate may also be used.

If it is determined, in determination processing as described above, that the deleted image is an image in which subject unclearness or subject blur has occurred or an image in which brightness of a subject is inappropriate, the procedure advances to S1105, and otherwise the procedure advances to S1103.

In S1103, determination is performed as to whether or not there was a significant change in a scene before/after the timing when the deleted image was shot.

As a determination method, detection information acquired immediately before the deleted image was shot is compared with detection information acquired immediately after shooting was executed, and if the similarity between the two pieces of detection information is smaller than a predetermined threshold, it can be determined that there was a significant change in the scene. As a method for comparing detection information, it is possible to use a technique similar to that of the similarity determination processing described in S1101.

If it is determined, in the above-described determination processing, that there was a significant change in the scene before/after the timing when the deleted image was shot, the procedure advances to S1105, and, if not, the procedure advances to S1104.

In S1104, the deleted image and detection information associated with the deleted image are added as a sample of an unfavorable scene to training data, and the neural network is trained for automatic image capturing. Note that the neural network may be trained every time training data is added, or the neural network may also be trained collectively when a predetermined number of pieces of training data is added.

In S1105, it is determined that learning the deleted image as a sample of an unfavorable scene is not appropriate, and this learning processing is ended without performing learning.

Learning processing that is based on a user's delete operation has been described above, but this learning processing does not necessarily need to be performed immediately in response to a user's erase operation, and a configuration may also be adopted in which a history of delete operations performed by the user is stored, and learning processing is performed at a later time.

In addition, the above-described learning processing does not necessarily need to be performed in the image capturing apparatus 101, and a configuration may also be adopted in which necessary information is transmitted to a server or the like that is linked with the image capturing apparatus, and the server separately performs learning processing. By receiving a result of learning by the server, the image capturing apparatus 101 can obtain an effect similar to that when the image capturing apparatus 101 itself is trained. In addition, a description has been given in which a deleted image is an image stored in the storage medium 219 or the non-volatile memory 214, but a deleted image may be an image stored in a server different from the image capturing apparatus 101. Note that a process for causing an image capturing apparatus to perform automatic image capturing using a learning result, a process for storing an image shot by an image capturing apparatus to a storage medium, a process for performing determination on an image that is used for learning, from a storage medium, and a process for performing learning using a determined image may be performed by respective apparatuses, or some or all of the processes may be performed in the same apparatus.

Next, learning that is performed in cooperation with an external communication device in this embodiment will be described. The following methods may be used in learning that is performed in cooperation with an external communication device in this embodiment.

3. Learning Based on External Communication Device Acquiring Image

As described with reference to FIG. 3, the image capturing apparatus 101 and the external device 301 have communication means for performing the communication 302 and the communication 303. Images are mainly transmitted/ received through the communication 302, and the external device 301 can acquire images in the image capturing apparatus 101 through communication via a dedicated application in the external device 301. In addition, in the external device 301, it is possible to view thumbnail images of image data stored in the image capturing apparatus 101, via the dedicated application in the external device 301. Accordingly, the user selects a thumbnail image that the user prefers from among the thumbnail images, confirms the image, gives an acquisition instruction, and thereby can acquire the image, in the external device 301.

At this time, since the image selected by the user is acquired in response to a transmission instruction (transmission request), it is very highly likely that the acquired image is an image that matches a user's taste. Thus, it is determined that the acquired image is an image to be learned, and, similar to S612 in FIG. 6, training data is generated from the acquired image, and learning is performed based on this training data. Accordingly, it is possible to perform various types of learning that match a user's taste.

Figure 8:
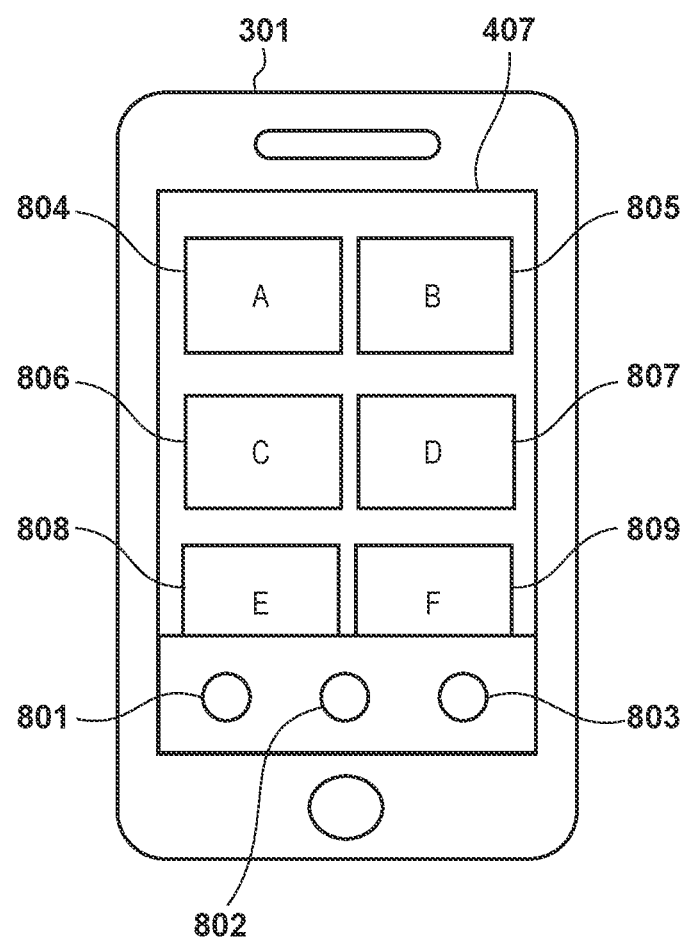
FIG. 8 is a diagram for illustrating image display processing.

An operation example will be described. FIG. 8 shows an example in which images in the image capturing apparatus 101 are being viewed via a dedicated application of the external device 301 that is a smart device. Thumbnail images (804 to 809) of image data stored in the image capturing apparatus 101 are displayed on the display device 407, and the user can select an image that the user prefers, and acquires the image. Here, change button icons 801, 802, and 803 for changing the display manner are provided. If the change button icon 801 is pressed, the display order is changed to a time-and-date priority display mode, and images in the image capturing apparatus 101 are displayed on the display device 407 in the order of shooting time and date. For example, the image 804 is displayed as being new (a new time and date), and the image 809 is displayed as being old (an old time and date). If the change button icon 802 is pressed, the display order is changed to a recommended image priority display mode. The images in the image capturing apparatus 101 are displayed on the display device 407 in the order of a highest score based on a score that is an evaluation result acquired by determining a user's taste for each of the images, the evaluation result having been calculated in S612 in FIG. 6. For example, the image 804 is displayed as having a high score, and the image 809 is displayed as having a low score. If the change button icon 803 is pressed, a person or object subject can be designated, and if a specific person or object subject is then designated, only a specific subject will be displayed.

The settings can be set to ON at the same time using the change button icons 801 to 803, and, for example, if all of the settings are ON, only a specified subject is displayed, and this display is performed with priority given to an image whose shooting time and date is new and an image with a high score.

As described above, only an image that matches a user's taste can be easily extracted from a large number of shot images, through simple confirmation work in order to perform learning on a user's taste in shot images as well.

4. Learning that is Performed by Inputting Determination Value to Image Via External Communication Device As described above, the image capturing apparatus 101 and the external device 301 have communication means, and images stored in the image capturing apparatus 101 can be viewed via a dedicated application in the external device 301. Here, a configuration may be adopted in which the user assign scores to images. A configuration is adopted in which a high score (for example, 5) can be assigned to an image that the user feels matches their taste, a low score (for example, 1) can be assigned to an image that the user feels doesn't match their taste, and the image capturing apparatus 101 is trained in accordance with a user's operation. The scores of the images are used for learning that is performed again in the image capturing apparatus along with training data. Learning is performed such that output of the neural network, in which feature data from designated image information is used as input, approximates a score designated by the user.

In this embodiment, a configuration is adopted in which the user inputs scores for shot images via the external device 301, but a configuration may also be adopted in which the image capturing apparatus 101 is operated so as to directly input scores for images. In that case, for example, a touch panel display is provided in the image capturing apparatus 101, and a mode for displaying a shot image is set in accordance with the user pressing a GUI button displayed on touch panel display. The user can then perform similar learning using a method for inputting scores to images, or the like, while confirming shot images.

5. Learning that is Performed by Changing Parameters in External Communication Device As described above, the image capturing apparatus 101 and the external device 301 have communication means, and learning parameters currently set in the image capturing apparatus 101 can be transmitted to the external device 301, and stored in the storage circuit 404 of the external device 301. Conceivable examples of learning parameters include a coupling weight between neurons of the neural network and selection of a subject that is input to the neural network. In addition, a configuration is adopted in which, using a dedicated application in the external device 301, learning parameters that are set in a dedicated server can be acquired via the public line control circuit 406, and be set as learning parameters in the image capturing apparatus 101. Accordingly, by storing parameters at a certain time point to the external device 301, and setting the parameters in the image capturing apparatus 101, learning parameters can be returned, and learning parameters of another user can be acquired via the dedicated server, and be set in the image capturing apparatus 101.

Next, a learning process sequence will be described. In the mode setting determination in S504 in FIG. 5, determination is performed as to whether or not to perform learning processing, and if determination is made to perform learning processing, it is determined that the learning mode is set, and the learning mode processing in S510 is performed.

Figure 9:
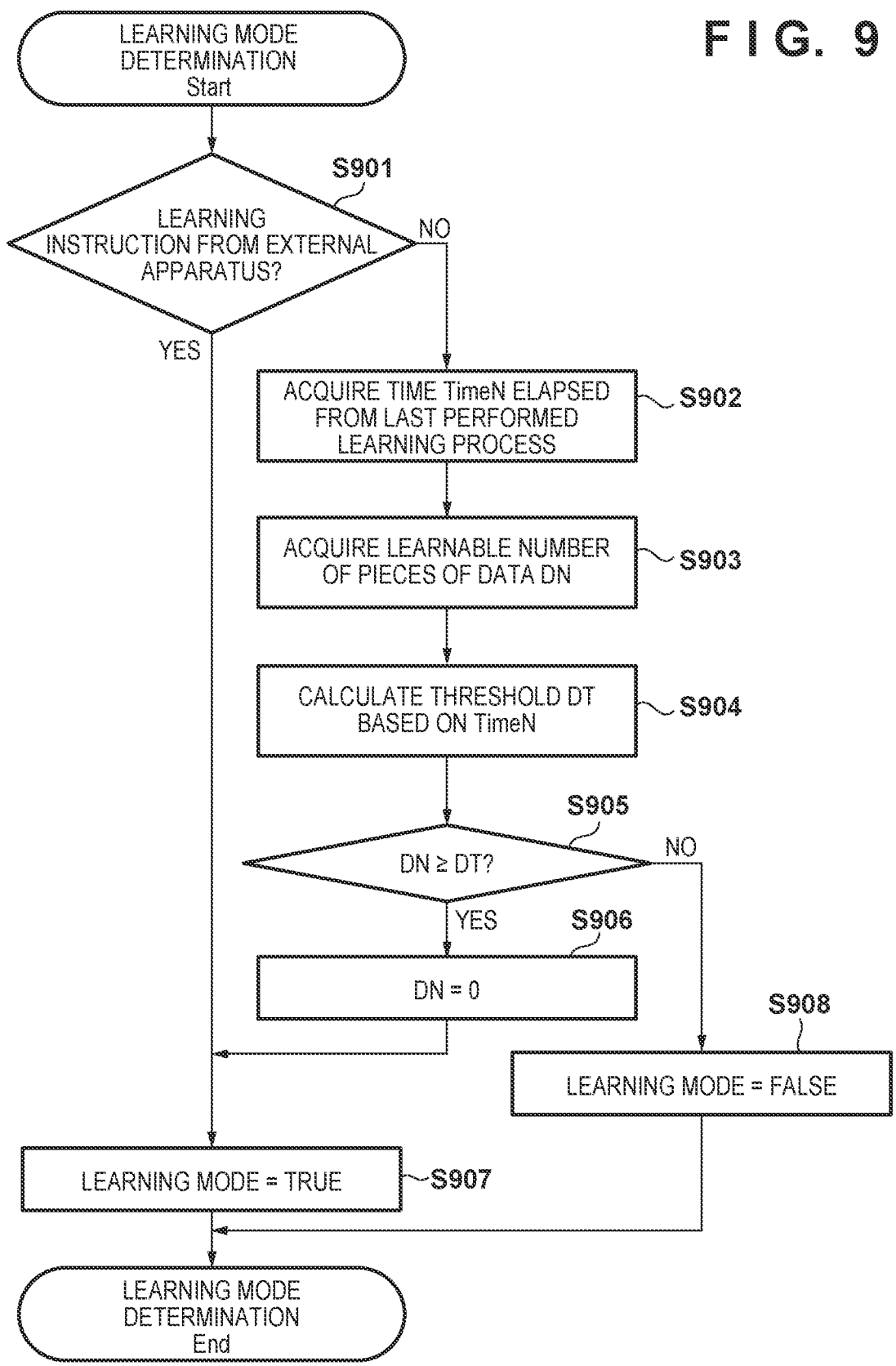
FIG. 9 is a flowchart illustrating learning mode determination.

A condition for determination of the learning mode will be described. Whether or not to transition to the learning mode is determined based on the time that has elapsed from when learning processing was last performed, the number of pieces of information that can be used for learning, whether or not a learning processing instruction has been given through a communication device, and the like. FIG. 9 shows a determination processing flow on whether or not to transition to a learning mode, the determination being performed in the mode setting determination processing in S504.

When an instruction to start learning mode determination in the mode setting determination processing in S504 is given, the processing in FIG. 9 starts. In S901, determination is performed as to whether or not a learning instruction has been given from an external apparatus. Here, the determination as to whether or not a learning instruction has been given is determination as to whether or not an instruction to set learning parameters has been given, as in "5. Learning That Is Performed by Parameter Changed in External Communication Device". If it is determined in S901 that a learning instruction has been given from the external device 301, the procedure advances to S907, where learning mode determination is set to TRUE, settings are made so as to perform the process in S510, and the learning mode determination processing ends. If it is determined in S901 that a learning instruction has not been given from the external apparatus, the procedure advances to S902.

In S902, a time TimeN that has elapsed from when the learning mode processing was last performed is acquired, and the procedure advances to S903. In S903, the number of pieces of new data DN to be learned (the number of images designated for learning during a period from when learning processing was last performed until the time TimeN) is acquired, and the procedure advances to S904. In S904, a threshold DT is calculated based on TimeN. Alternatively, a table for obtaining the threshold DT from TimeN may be prepared. For example, a threshold DTa when TimeN is smaller than a predetermined value is set larger than a threshold DTb when TimeN is larger than the predetermined value, and a threshold is set to decrease as the time elapses. Accordingly, a configuration can be adopted in which, even if the amount of training data is small, the image capturing apparatus can easily change to the learning mode when the image capturing apparatus is used for a long time, by performing learning again if a long period of time has elapsed. Note that the threshold DT is preferably set large such that the image capturing apparatus does not transition to the learning mode for a certain period from the time when the learning mode processing was performed.

When the threshold DT is calculated in S904, the procedure advances to S905, and determination is performed as to whether or not the number of pieces of data DN to be learned is larger than or equal to the threshold DT. If the number of pieces of data DN is larger than or equal to the threshold DT, the procedure advances to S906, and DN is set to 0. The procedure then advances to S907, where the learning mode determination is set to TRUE, settings are made so as to perform the process in S510, and the learning mode determination processing is ended.

If the number of pieces of data DN is determined as being smaller than the threshold DT in S905, the procedure advances to S908. In S908, since there is no registration instruction from the external device 301 nor learning instruction from the external apparatus, and the number of pieces of training data is smaller than the predetermined value, the learning mode determination is set to FALSE so that settings are made so as to not perform the process in S510, and the learning mode determination processing is ended.

Figure 10:
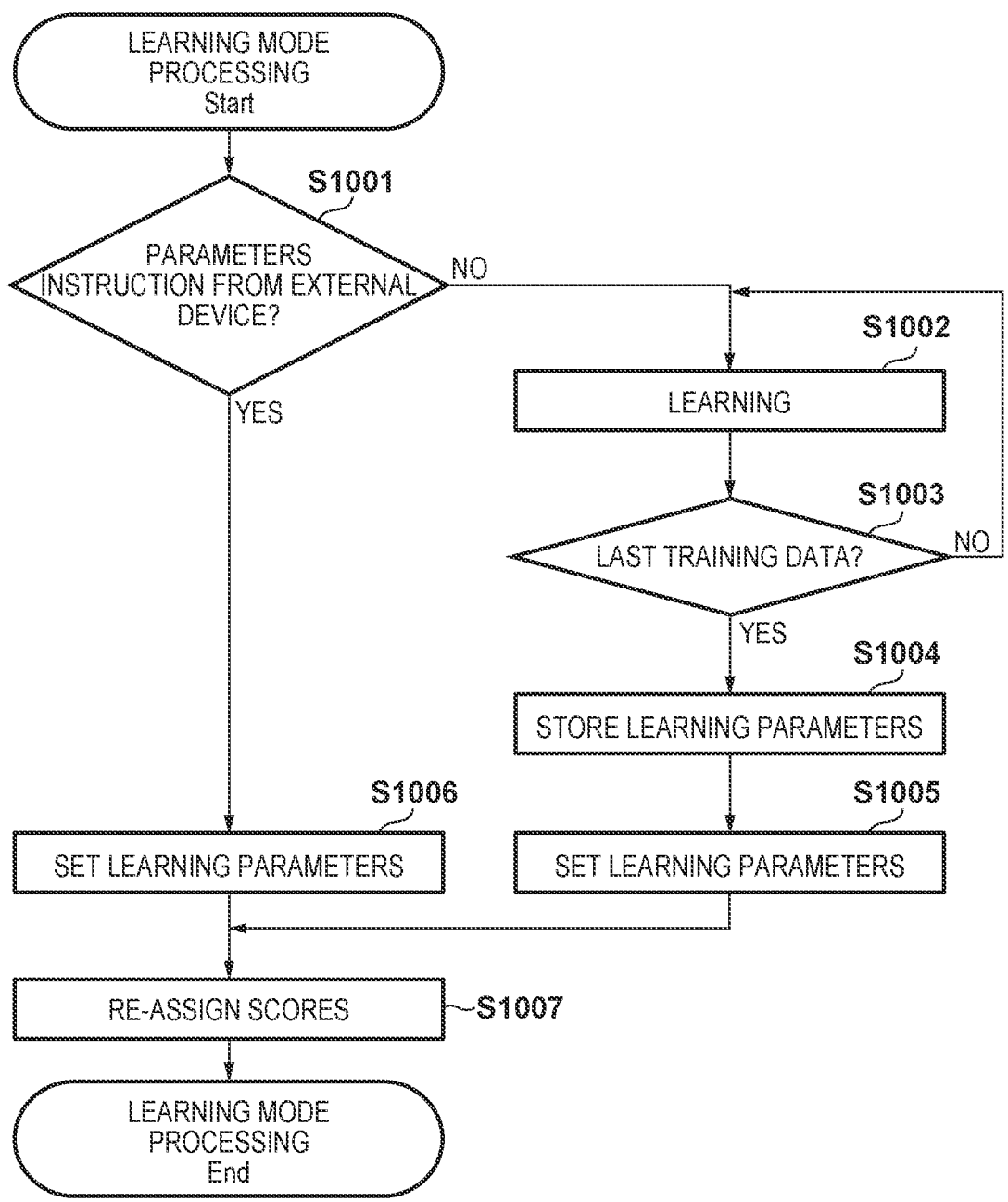
FIG. 10 is a flowchart illustrating learning mode processing.

If it is determined in S509 in FIG. 5 that the learning mode is set, and the procedure advances to S510, processing in FIG. 10 starts. In S1001, determination is performed as to whether or not an instruction to set learning parameters has been given from the external device 301. If an instruction to set learning parameters has been given from the external device 301, the procedure advances to S1006, where learning parameters transmitted from the external apparatus are set to respective determination elements (coupling weight between neurons of the neural network, etc.), and the procedure advances to S1007. If it is determined in S1001 that a learning instruction has not been given from the external device 301, the procedure advances to S1002.

In S1002, a piece of training data is selected, and machine learning is performed. This training data may include training data generated from a shot image to which information indicating that the image is a manually shot image is added, training data that is based on an erase operation performed by the user, training data generated from an image acquired by an external communication device, and training data generated from a shot image to which a determination value has been input via an external communication device. Learning is performed using a method such as a backpropagation method or a gradient descent method, and a coupling weight between neurons of the neural network is calculated again, and the parameters of the determination elements are changed. If the user has assigned scores to images based on which training data was generated, learning in which the scores are taken into consideration is performed.

In S1003, determination is performed as to whether or not learning was performed using all of the training data prepared for machine learning. If there is still remaining training data, the procedure returns to S1002, and, if learning has been performed using all of the training data, the procedure advances to S1004.

In S1004, learning parameters obtained through machine learning are stored in the non-volatile memory 214 in association with a reference number of times.

In S1005, the most recent learning parameters stored in S1004 are set to the determination elements (coupling weight between neurons of the neural network, etc.), and the procedure advances to S1007.

In S1007, scores are re-assigned to images in the recording medium 219 or the non-volatile memory 214 (reevaluation). In this embodiment, a configuration is adopted in which scores are assigned to all of the shot images recorded in the recording medium 219 or the non-volatile memory 214 based on a new learning result, and automatic editing and automatic file deletion are performed according to the assigned scores. Accordingly, when learning is performed again or learning parameters are set from an external apparatus, the scores of the shot images need to be updated. Thus, in S1007, recalculation for assigning new scores to shot images stored in the recording medium 219 or the non-volatile memory 214 is performed, and, when the processing ends, the learning mode processing is ended. Note that recalculation for assigning new scores may also be performed in accordance with a user's instruction.

In this embodiment, a description was given based on a configuration in which learning is performed within the image capturing apparatus 101, but a similar learning effect can be realized by adopting a configuration in which the external device 301 is provided with a learning function, data necessary for learning is transmitted to the external device 301, and learning is executed only on the external apparatus side. In that case, a configuration may be adopted in which parameters such as a coupling weight between neurons of the neural network trained on the external apparatus side are transmitted to image capturing apparatus 101 and are set, and thereby learning is performed, as described above in "5. Learning That Is Performed by Parameter Changed in External Communication Device".

In addition, a configuration may also be adopted in which both the image capturing apparatus 101 and the external device 301 have a learning processing function. A configuration may also be adopted in which training data held in the external device 301 is transmitted to the image capturing apparatus 101, for example, at a timing when learning mode processing is performed in the image capturing apparatus 101, learning parameters are merged, and thereby learning is performed.

As described above, according to the above embodiment, from among images erased by the user, only images determined to have been erased due to purely not matching a user's taste, not due to a shooting error or the like are learned as images of an unfavorable scene. This learning makes it possible to keep a scene that does not match a user's taste from being shot, without the user performing a specific operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103947, filed on Jun. 3, 2019, which is hereby incorporated by reference herein in its entirety.

What is claimed is:

1. An image processing apparatus comprising
at least one processor or circuit configured to function as
a determination unit configured to determine that image data stored in a storage device is image data that is to be used for learning a situation in which an image capturing device is to perform automatic image capturing, if an instruction to delete the image data stored in the storage device is given by a user, and the image data satisfies a predetermined condition.

2. The image processing apparatus according to claim 1, wherein the determination unit determines whether or not the image data satisfies the predetermined condition, based on at least one of the image data and information associated with the image data.

3. The image processing apparatus according to claim 1, wherein the at least one processor or circuit is configured to further function as
a similarity determination unit configured to determine a similarity between the image data for which a delete instruction has been given by the user and other image data stored in the storage device,
wherein, if the similarity determination unit determines that the image data stored in the storage device includes image data similar to the image data for which a delete instruction has been given by the user, the determination unit determines that the predetermined condition is not satisfied.

4. The image processing apparatus according to claim 3, wherein the similarity determination unit extracts a first feature point group from the image data for which a delete instruction has been given by the user, through feature point extraction processing, extracts a second feature point group from other image data stored in the storage device, through the feature point extraction processing, performs matching processing on the first feature point group and the second feature point group, and determines a higher similarity the higher the number of pairs of similar feature points is.

5. The image processing apparatus according to claim 3, wherein the similarity determination unit determines a similarity between images by comparing information associated with the other image data stored in the storage device with information associated with the image data for which a delete instruction has been given by the user.

6. The image processing apparatus according to claim 3, wherein the similarity determination unit determines a similarity between images for which at least one of shooting time information and shooting position information associated with the other image data stored in the storage device is different from at least one of those associated with the image data for which a delete instruction has been given by the user by a predetermined threshold or smaller.

7. The image processing apparatus according to claim 1, wherein, if a state of the image data for which a delete instruction has been given by the user is at least one of a state of subject unclearness, a state of subject blur, and a state where exposure of a subject is not appropriate, the determination unit determines that the predetermined condition is not satisfied.

8. The image processing apparatus according to claim 1, wherein, if a difference in information associated with the image data for which a delete instruction has been given by the user, before/after the image data for which a delete instruction has been given by the user was captured is large, the determination unit determines that the predetermined condition is not satisfied.

9. The image processing apparatus according to claim 1, wherein the at least one processor or circuit is configured to further function as
a learning unit configured to learn a situation in which the automatic image capturing is not to be performed, using at least one of image data determined by the determination unit to be image data that is used for learning a situation in which the automatic image capturing is to be performed and information associated with the image data.

10. The image processing apparatus according to claim 9, further comprising
the image capturing device configured to perform automatic image capturing based on a result of learning performed by the learning unit.

11. The image processing apparatus according to claim 10, wherein the storage device stores image data generated by the image capturing device.

12. A control method of an image processing apparatus, the method comprising
determining that image data stored in a storage device is image data that is to be used for learning a situation in which an image capturing device is to perform automatic image capturing, if an instruction to delete the image data stored in the storage device is given by a user, and the image data satisfies a predetermined condition.

13. A non-transitory computer-readable storage medium that stores a program for causing a computer to execute the control method of an image processing apparatus, the method comprising
determining that image data stored in a storage device is image data that is to be used for learning a situation in which an image capturing device is to perform automatic image capturing, if an instruction to delete the image data stored in the storage device is given by a user, and the image data satisfies a predetermined condition.

* * * * *